UNITED STATES PATENT OFFICE.

HENRY W. JOHNS, OF NEW YORK, N. Y.

IMPROVEMENT IN COMPOUNDS FOR ROOFING AND OTHER PURPOSES.

Specification forming part of Letters Patent No. 76,773, dated April 14, 1868; reissue No. 5,948, dated June 30, 1874; application filed May 1, 1874.

DIVISION A.

*To all whom it may concern:*

Be it known that I, HENRY W. JOHNS, of the city, county, and State of New York, have invented a new Composition of Matter for Roofs and other Surfaces; and that the following is a full, clear, and exact description of the same, and of the manner of preparing and using the same.

My said invention, which relates to an improved fire-proof paint or cement specially intended for coating roofs, but which is equally applicable to the coating of other surfaces, consists in compounding asbestus, which is the characteristic ingredient, with oil or oily matter, and pigments, when special colors are required.

The asbestus is reduced to a powder or fiber by any of the well-known methods, and after being so prepared it is mixed with linseed or equivalent oil as pigments are usually mixed with oil. I have found eight pounds of asbestus to one gallon of linseed oil a good proportion for paint; but the proportions may be varied at will, and depending upon the uses to be made of the compound, and whether to be used as a paint or cement. If it is to be used as a cement, the proportions should be about fifteen pounds of asbestus to one gallon of linseed-oil, preferably boiled; but when the color due to the asbestus and oil is not suitable, pigments are to be added to produce a paint of any specific color. Such pigment or pigments may be added to the asbestus and oil after these have been mixed; or the whole may be mixed together, or the oil and pigment first mixed, as in the usual way of preparing paints, and the asbestus then added, and the consistency determined according to the use.

Any oil or oily substance, such as petroleum, rosin, the residuum of palm-oil, oil-foots, or their equivalents, may be used. For cements it will be found best to use oil which has been much concentrated by boiling. Whether to be used as a paint or cement, other substances may be added to the compound of asbestus and oil to give it more body and toughness, such as mineral or vegetable pitch or tar, bitumen, resin, or equivalent gums, or neutral bodies, such as suitably-prepared silica, marble-dust, or other mineral bodies.

What I claim as my invention, and desire to secure by Letters Patent, is—

1. The compound of asbestus and oil, or oily body, prepared substantially as described, as a coating, paint, or cement, as set forth.

2. The compound of asbestus, oil, or oily body, and pigments, as a paint or cement, substantially as described.

HENRY W. JOHNS.

Witnesses:

T. W. BAXTER,
C. H. PATRICK.